No. 647,085. Patented Apr. 10, 1900.
H. S. GLADSTONE.
SECONDARY BATTERY.
(Application filed Jan. 2, 1900.)
(No Model.) 2 Sheets—Sheet 1.
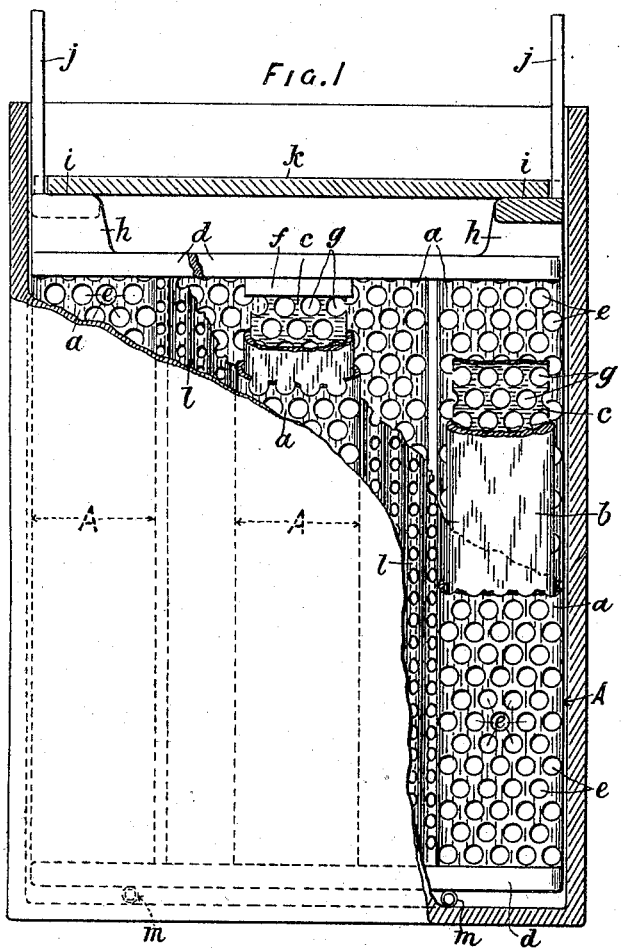
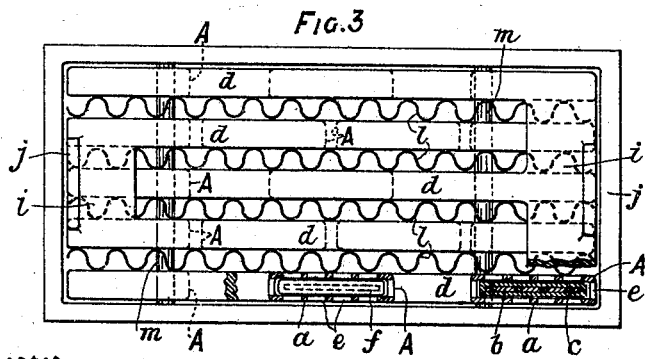

No. 647,085. Patented Apr. 10, 1900.
H. S. GLADSTONE.
SECONDARY BATTERY.
(Application filed Jan. 2, 1900.)
(No Model.) 2 Sheets—Sheet 2.
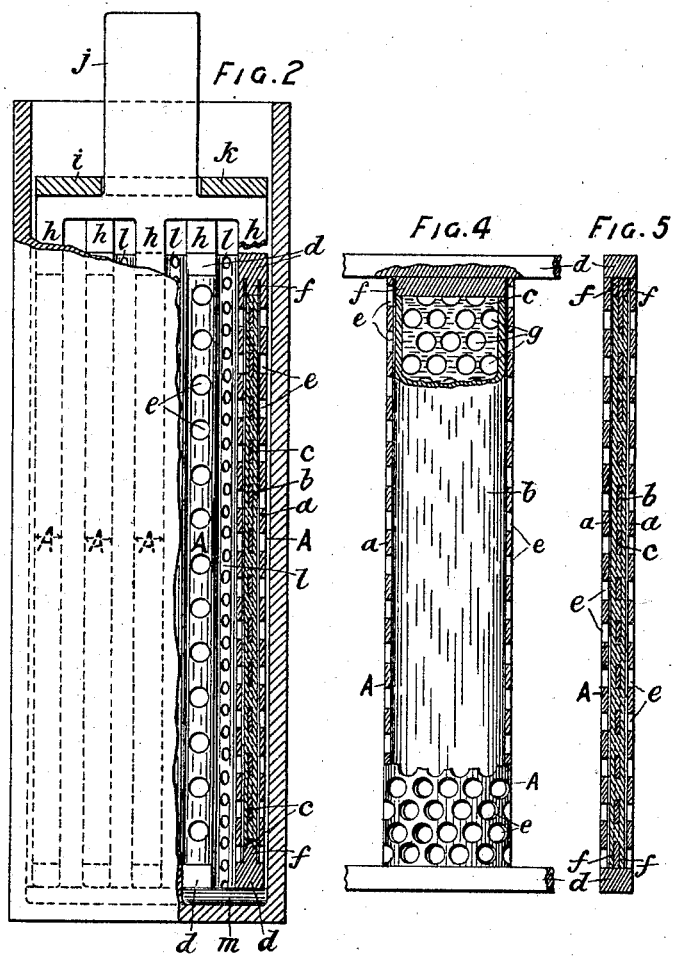

UNITED STATES PATENT OFFICE.

HAROLD STEUART GLADSTONE, OF LONDON, ENGLAND.

SECONDARY BATTERY.

SPECIFICATION forming part of Letters Patent No. 647,085, dated April 10, 1900.

Application filed January 2, 1900. Serial No. 77. (No model.)

*To all whom it may concern:*

Be it known that I, HAROLD STEUART GLADSTONE, electrical engineer, a resident of 34 Brechin Place, South Kensington, London, S. W., England, have invented new and useful Improvements in Secondary Batteries, (for which an application for patent has been filed in Great Britain, dated March 15, 1899, No. 5,647,) of which the following is a full, clear, and exact description.

This invention relates to an improvement in secondary batteries, and has for its object to produce a battery having a low internal resistance and capable of a high rate of discharge without liability of disintegration of the active material or buckling of the electrodes.

Reference is to be had to the accompanying drawings, forming part of this specification, wherein—

Figure 1 is a side elevation, and Fig. 2 an end elevation, of a cell, the casing and portions of the electrodes being broken away in both views in order to better show the construction. Fig. 3 is a plan view, partly in section, of the cell with the cover removed. Fig. 4 is a sectional side elevation of a single member of an electrode, and Fig. 5 is a vertical section of the same.

The electrodes may be made in the form of a grid-like structure composed of parallel members separated by narrow intervals and united at the ends to connecting-bars, or the members may be used separately as independent electrodes. Each such member A is formed of a flattened tubular envelop $a$, of perforated sheet-lead, inclosing the active material $b$, in which is embedded a central core-strip $c$, also of perforated sheet-lead, provided with means of attachment to the top and bottom connecting-bars $d$, as hereinafter described.

The envelop $a$ is made of sheet-lead which has been perforated by punching rows of small holes $e$—say from three-sixteenths to three-eighths of an inch in diameter—in it as close together as is consistent with structural strength and is formed by lapping the perforated sheet metal about a mandrel and made into a complete tube of the required flattened sectional form by burning together the abutting edges of the strip by autogenous soldering. The central core-strip $c$ is also of sheet-lead perforated as before and has cast upon its ends lugs $f$, of lead, which project from both sides of the strip so as to fit in the tubular perforated envelop $a$, so as to maintain the space required for the active material between the core and envelop, the ends of the core $c$ and lugs $f$ being flush with the ends of the envelop. Upon both sides of the core-strip $c$ the active material $b$ is applied in the form of paste, the paste being packed onto the strip in a mold so as, by completely filling up the perforations $g$ of the core-strip, to make good conductive contact therewith over the entire surface of the strip, including the lateral surfaces of the perforations by which the area of contact-surface is greatly increased. The layers of active material $b$ fill up the whole of the spaces between the end lugs $f$ of the strip $c$ on both sides to a thickness uniform with that of such lugs. The pasted or coated strip is then placed within the perforated envelop $a$, and when a member thus constituted is to be used separately as an independent electrode the end lugs $f$ of the core $c$ are burned or united by autogenous soldering to the envelop. When, however, a number of members so constituted are to be united by connecting-bars to form a grid-like structure, as shown in the drawings, such burning or soldering of the lugs $f$ to the envelop $a$ is not required; but the ends of the lugs and the ends of the envelop (which are filled up or closed by the lugs of the strip, so as to prevent the active material falling out) are in the case of each member filed flush or smooth, and the series of members A, which are made of uniform length, are assembled in requisite numbers to form an electrode or plate. For this purpose the members A are placed edge to edge at suitable intervals apart and are connected at top and bottom by bars $d$ of lead containing a small percentage of antimony or other alloy, to which their smoothed ends are united by autogenous soldering or burning on, so as to make a rigid structure or plate of grid-like form and insure good conductive union with the connecting-bars, of which the top one is provided with the usual lug $h$ for connection with the terminal of the cell. A series of such grid-like plates may be combined to form an electrode, the plates being arranged parallel to one another at suitable intervals apart and connected together, as shown in the drawings, by means of bridge-pieces $i$, burned onto the lugs $h$. In this case the plates forming, respectively, the positive and the negative electrodes are disposed alternately, so as to face one another, the bridge-pieces $i$, connecting, respectively, the positive and the negative elements being preferably at opposite ends of the cell, as shown, and having each a tang $j$, adapted to pass through the cover $k$ of the cell for attachment to the conducting-wire. The adjacent positive and negative elements are held apart, preferably by means of diaphragms $l$, formed of corrugated sheets of perforated vulcanite or other suitable material, and the entire series of elements rests upon ribs or bars $m$ of insulating material, so as to afford access of the electrolyte to all portions of the electrodes, the arrangement as a whole being exceedingly compact and presenting a very large active surface within a relatively-small space.

I claim—

1. An electrode for secondary batteries consisting of a flattened envelop of perforated sheet-lead, a mass of active material inclosed by said envelop, and a central core embedded in the active material and consisting of a strip of perforated sheet-lead having end lugs of lead which serve as distance-pieces to maintain the space for the active material between the core and the envelop, substantially as specified.

2. An electrode for secondary batteries consisting of a grid-like plate formed of a series of flat bar-like members juxtaposed edgewise at suitable intervals apart and connected together at top and bottom by bars of lead; each such bar-like member consisting of a flattened envelop of perforated sheet-lead, a mass of active material inclosed by said envelop, and a core embedded in the active material and consisting of a strip of perforated sheet-lead of the same length as the envelop and having end lugs of lead which serve as distance-pieces to maintain the space for the active material between the core and envelop substantially as specified.

3. An electrode for secondary batteries consisting of a series of grid-like plates arranged parallel to and facing one another at suitable intervals apart and connected together by means of bridge-pieces of lead burned onto the top bars of the plates, each such grid-like plate being composed of a series of flat bar-like members juxtaposed edgewise at suitable intervals apart and connected together at top and bottom by bars of lead; each such bar-like member consisting of a flattened envelop of perforated sheet-lead, a mass of active material inclosed by said envelop, and a core embedded in the active material and consisting of a strip of perforated sheet-lead of the same length as the envelop and having end lugs of lead which serve as distance-pieces to maintain the space for the active material between the core and envelop, substantially as specified.

4. A secondary battery in which the positive and negative electrodes consist each of a series of grid-like plates forming elements arranged parallel to one another, the positive and negative elements being disposed alternately so as to face one another at intervals apart maintained by means of perforated diaphragms of insulating material as described; the elements of the positive and of the negative electrodes being respectively connected by means of bridge-pieces of lead burned onto the top bars of the grid-like plates; each such grid-like plate being composed of a series of flat bar-like members juxtaposed edgewise at suitable intervals apart and connected together at top and bottom by bars of lead; each such bar-like member consisting of a flattened envelop of perforated sheet-lead, a mass of active material inclosed by said envelop and a core embedded in the active material and consisting of a strip of perforated sheet-lead of the same length as the envelop and having end lugs of lead which serve as distance-pieces to maintain the space for the active material between the core and envelop substantially as specified.

Signed by the said HAROLD STEUART GLADSTONE this 13th day of October, 1899.

HAROLD STEUART GLADSTONE.

In presence of—
R. S. JOHNSTONE,
C. A. FRASER.